(12) United States Patent
Tashiro

(10) Patent No.: US 12,466,129 B2
(45) Date of Patent: Nov. 11, 2025

(54) METHOD FOR MANUFACTURING THREE-DIMENSIONAL SHAPED OBJECT, THREE-DIMENSIONAL SHAPING SYSTEM, AND INFORMATION PROCESSING APPARATUS

(71) Applicant: SEIKO EPSON CORPORATION, Tokyo (JP)

(72) Inventor: Takumi Tashiro, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 157 days.

(21) Appl. No.: 18/492,849

(22) Filed: Oct. 24, 2023

(65) Prior Publication Data
US 2024/0131785 A1 Apr. 25, 2024
US 2024/0227288 A9 Jul. 11, 2024

(30) Foreign Application Priority Data
Oct. 25, 2022 (JP) ................................ 2022-170549

(51) Int. Cl.
*B29C 64/236* (2017.01)
*B29C 64/209* (2017.01)
(Continued)

(52) U.S. Cl.
CPC .......... *B29C 64/236* (2017.08); *B29C 64/209* (2017.08); *B29C 64/232* (2017.08); *B29C 64/393* (2017.08); *B33Y 10/00* (2014.12)

(58) Field of Classification Search
CPC ... B29C 64/236; B29C 64/232; B29C 64/209; B29C 64/118; B29C 64/386; B29C 64/393; B33Y 50/00; B33Y 50/02
See application file for complete search history.

(56) References Cited

U.S. PATENT DOCUMENTS

2017/0355142 A1* 12/2017 Sterman ................ B29C 64/209
2018/0354196 A1* 12/2018 Wu ........................ B29C 64/245
(Continued)

FOREIGN PATENT DOCUMENTS

JP 2006-192710 A 7/2006

*Primary Examiner* — Andrew L Swanson
(74) *Attorney, Agent, or Firm* — Harness, Dickey & Pierce, P.L.C.

(57) ABSTRACT

A method for manufacturing a three-dimensional shaped object in which a three-dimensional shaped object is shaped by discharging a shaping material from a nozzle and laminating layers in a lamination direction includes: a first step of stopping the discharge of the shaping material from the nozzle; and a second step of moving the nozzle from a discharge stop position at which the discharge of the shaping material is stopped to a discharge restart position that is located in the same layer as the discharge stop position and at which the discharge of the shaping material is restarted. The second step includes: a third step of retracting the nozzle from the discharge stop position in the lamination direction according to a retraction amount that is a movement distance of the nozzle in the lamination direction; and a fourth step of moving the nozzle to a position above the discharge restart position along the layer after the third step, and at least one of whether to retract the nozzle or the retraction amount is determined according to a shaping condition of the three-dimensional shaped object.

6 Claims, 14 Drawing Sheets

(51) Int. Cl.
    *B29C 64/232*     (2017.01)
    *B29C 64/393*     (2017.01)
    *B33Y 10/00*     (2015.01)

(56) References Cited

U.S. PATENT DOCUMENTS

| | | | |
|---|---|---|---|
| 2019/0283329 A1* | 9/2019 | Lensgraf | B29C 64/40 |
| 2019/0361426 A1* | 11/2019 | Connor | B33Y 50/02 |
| 2020/0086577 A1* | 3/2020 | Pappas | B33Y 50/02 |
| 2020/0324486 A1* | 10/2020 | Mantell | B29C 64/112 |
| 2021/0034038 A1* | 2/2021 | Gay | G05B 19/4099 |

* cited by examiner

FIG. 9
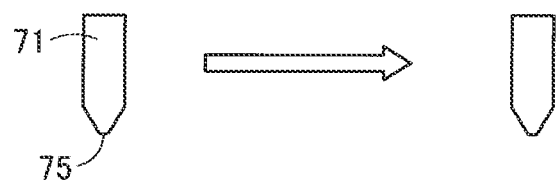
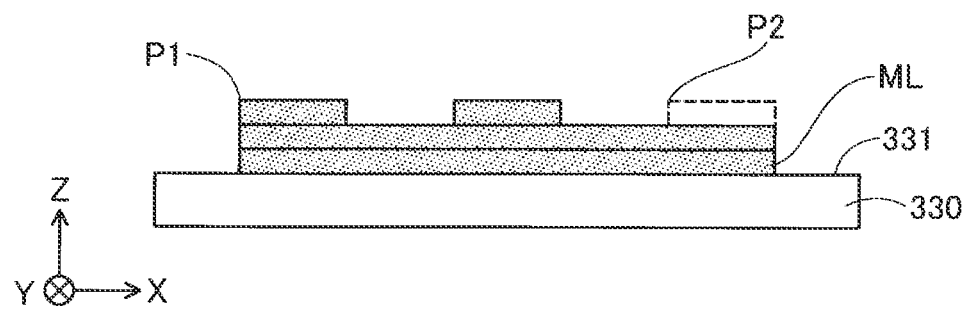
FIG. 10
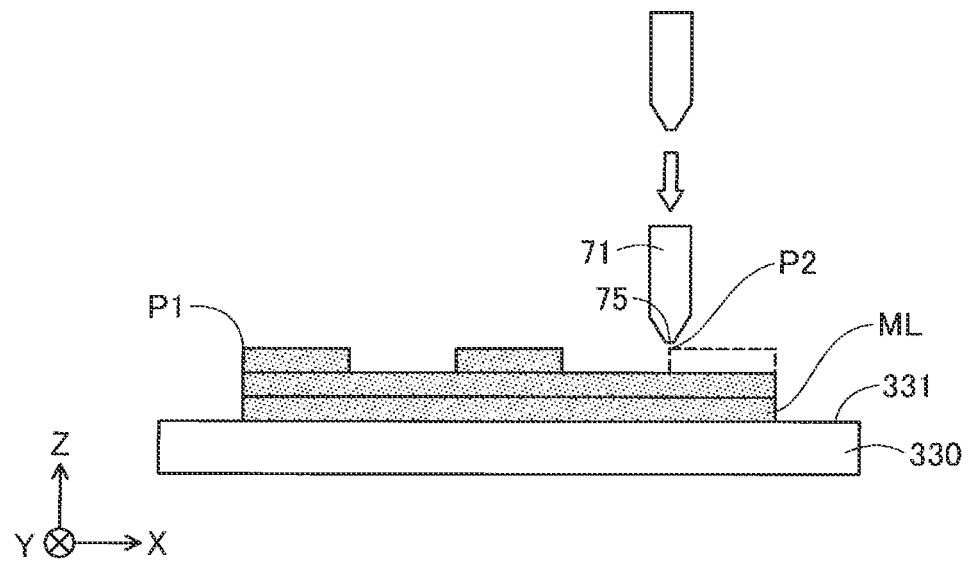

METHOD FOR MANUFACTURING THREE-DIMENSIONAL SHAPED OBJECT, THREE-DIMENSIONAL SHAPING SYSTEM, AND INFORMATION PROCESSING APPARATUS

The present application is based on, and claims priority from JP Application Serial Number 2022-170549, filed Oct. 25, 2022, the disclosure of which is hereby incorporated by reference herein in its entirety.

BACKGROUND

1. Technical Field

The present disclosure relates to a method for manufacturing a three-dimensional shaped object, a three-dimensional shaping system, and an information processing apparatus.

2. Related Art

For example, JP-A-2006-192710 discloses a molten resin extrusion lamination shaping method in which a molten thermoplastic material is extruded onto a base from an extrusion nozzle that performs scanning according to preset shape data, and in which the molten material is further laminated on the material cured on the base to create a three-dimensional shaped object.

In shaping of a three-dimensional shaped object by laminating a shaping material on a table, discharge of the shaping material from a nozzle may be temporarily stopped, and then the nozzle may be moved to a different position in the same layer to restart the discharge of the shaping material. In this case, there is a problem that the nozzle may come into contact with a part of the three-dimensional shaped object that has been already shaped when the nozzle is moved.

SUMMARY

According to a first aspect of the present disclosure, a method for manufacturing a three-dimensional shaped object is provided. The method for manufacturing a three-dimensional shaped object is a method for manufacturing a three-dimensional shaped object in which a three-dimensional shaped object is shaped by discharging a shaping material from a nozzle and laminating layers in a lamination direction, and includes: a first step of stopping the discharge of the shaping material from the nozzle; and a second step of moving the nozzle from a discharge stop position at which the discharge of the shaping material is stopped to a discharge restart position that is located in the same layer as the discharge stop position and at which the discharge of the shaping material is restarted. The second step includes: a third step of retracting the nozzle from the discharge stop position in the lamination direction according to a retraction amount that is a movement distance of the nozzle in the lamination direction; and a fourth step of moving the nozzle to a position above the discharge restart position along the layer after the third step. At least one of whether to retract the nozzle or the retraction amount is determined according to a shaping condition of the three-dimensional shaped object.

According to a second aspect of the present disclosure, a three-dimensional shaping system is provided. The three-dimensional shaping system includes: a plasticization unit configured to plasticize a material to generate a shaping material; a discharge unit including a nozzle configured to discharge the shaping material; a table on which the shaping material discharged from the nozzle is laminated; a position change unit configured to change a relative position between the nozzle and the table; a data generation unit configured to generate path data representing a movement path of the nozzle with respect to the table; and a control unit configured to control the plasticization unit, the discharge unit, and the position change unit, move the nozzle with respect to the table according to the path data, and shape a three-dimensional shaped object by laminating layers of the shaping material on the table in a lamination direction. When the nozzle is moved from a discharge stop position at which the discharge of the shaping material from the nozzle is stopped to a discharge restart position that is located in the same layer as the discharge stop position and at which the discharge of the shaping material is restarted, the data generation unit or the control unit determines, according to a shaping condition of the three-dimensional shaped object, at least one of whether to retract the nozzle from the discharge stop position in the lamination direction or a retraction amount that is a movement distance of the nozzle in the lamination direction when the nozzle is retracted in the lamination direction, and the control unit moves the nozzle to a position above the discharge restart position along the layer after retracting the nozzle in the lamination direction when the nozzle is retracted in the lamination direction.

According to a third aspect of the present disclosure, an information processing apparatus is provided. The information processing apparatus is an information processing apparatus for generating data for shaping a three-dimensional shaped object by discharging a shaping material from a nozzle to laminate layers in a lamination direction, and includes a data generation unit configured to generate path data representing a path along which the nozzle is moved in the shaping of the three-dimensional shaped object. When a parallel movement path in which the nozzle is moved along the layer from a discharge stop position at which the discharge of the shaping material from the nozzle is stopped to a discharge restart position that is located in the same layer as the discharge stop position and at which the discharge of the shaping material from the nozzle is restarted is included in the path data, the data generation unit determines, according to a shaping condition of the three-dimensional shaped object, at least one of whether to retract the nozzle from the discharge stop position in the lamination direction or a retraction amount that is a movement distance of the nozzle in the lamination direction when the nozzle is retracted in the lamination direction, and changes the path data such that the nozzle is retracted from the discharge stop position in the lamination direction according to the retraction amount in the parallel movement path.

BRIEF DESCRIPTION OF THE DRAWINGS

FIG. 9 is a view showing a movement path of the nozzle in the changed path data.

FIG. 10 is a view showing a movement path of the nozzle in the changed path data.

DESCRIPTION OF EMBODIMENTS

A. First Embodiment

Figure 1:
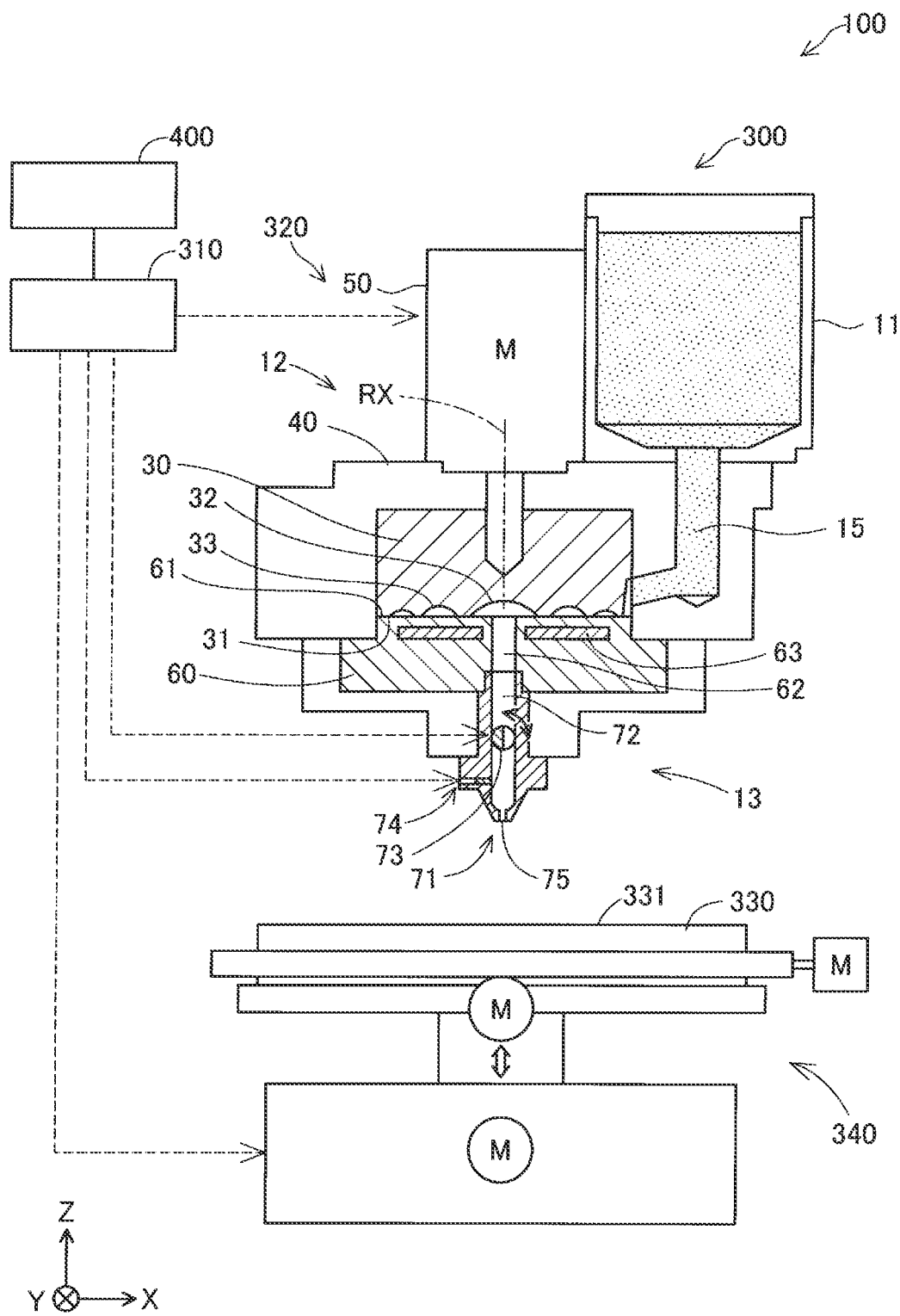
FIG. 1 is an explanatory view showing a schematic configuration of a three-dimensional shaping system according to a first embodiment.

FIG. 1 is an explanatory view showing a schematic configuration of a three-dimensional shaping system 100 according to the embodiment. In FIG. 1, arrows indicating X, Y, and Z directions orthogonal to one another are shown. The X direction and the Y direction are parallel to a horizontal plane. The Z direction is a direction parallel to a vertical direction. The X, Y, and Z directions in FIG. 1 and X, Y, and Z directions in other drawings indicate the same directions. When an orientation is specified, a positive direction that is a direction indicated by an arrow is set as "+", a negative direction that is a direction opposite to the direction indicated by the arrow is set as "−", and positive and negative signs are used in combination for direction notation.

The three-dimensional shaping system 100 includes a three-dimensional shaping device 300 and an information processing apparatus 400. The three-dimensional shaping device 300 includes a control unit 310 for controlling units of the three-dimensional shaping device 300. The control unit 310 and the information processing apparatus 400 are communicably connected to each other.

The three-dimensional shaping device 300 further includes a shaping unit 320, a table 330, and a position change unit 340.

Under the control of the control unit 310, the shaping unit 320 discharges a shaping material, which is obtained by plasticizing a material in a solid state to make the material into a paste shape, onto the table 330 which is a base of a three-dimensional shaped object. The shaping unit 320 includes a material supply unit 11, a plasticization unit 12, and a discharge unit 13.

The material supply unit 11 supplies a material for generating the shaping material to the plasticization unit 12. The material supply unit 11 is implemented by, for example, a hopper. A pellet-shaped or powder-shaped material is housed in the material supply unit 11. Examples of the material include a thermoplastic resin such as a polypropylene resin (PP), a polyethylene resin (PE), and a polyacetal resin (POM). A communication path 15 that couples the material supply unit 11 to the plasticization unit 12 is provided below the material supply unit 11. The material supply unit 11 supplies the material to the plasticization unit 12 via the communication path 15.

The plasticization unit 12 plasticizes at least a part of the material supplied from the material supply unit 11, generates a paste-shaped shaping material having fluidity, and guides the generated shaping material to the discharge unit 13. Here, the term "plasticization" is a concept including melting, and means a change from a solid state to a state having the fluidity. Specifically, in a case of a material in which glass transition occurs, the plasticization refers to setting a temperature of the material to be equal to or larger than a glass transition point. In a case of a material in which the glass transition does not occur, the plasticization refers to setting a temperature of the material to be equal to or larger than a melting point thereof. The plasticization unit 12 includes a screw 30, a screw case 40, a drive motor 50, and a barrel 60.

The screw 30 is housed in the screw case 40. An upper surface side of the screw 30 is coupled to the drive motor 50. The screw 30 rotates in the screw case 40 by a rotational driving force generated by the drive motor 50. An axial direction of a rotation axis RX of the screw 30 is a direction along the Z direction. A rotational speed of the screw 30 is controlled by the control unit 310 controlling a rotational speed of the drive motor 50. The screw 30 may be driven by the drive motor 50 via a speed reducer. The screw 30 is also called a rotor or a flat screw.

The barrel 60 is provided on a −Z direction side of the screw 30. A facing surface 61 that is an upper surface of the barrel 60 faces a lower surface 31 of the screw 30. A communication hole 62 communicating with a flow path 72 of the discharge unit 13 is formed in a center of the barrel 60. A plasticization heater 63 is provided in the barrel 60. A temperature of the plasticization heater 63 is controlled by the control unit 310.

Figure 2:
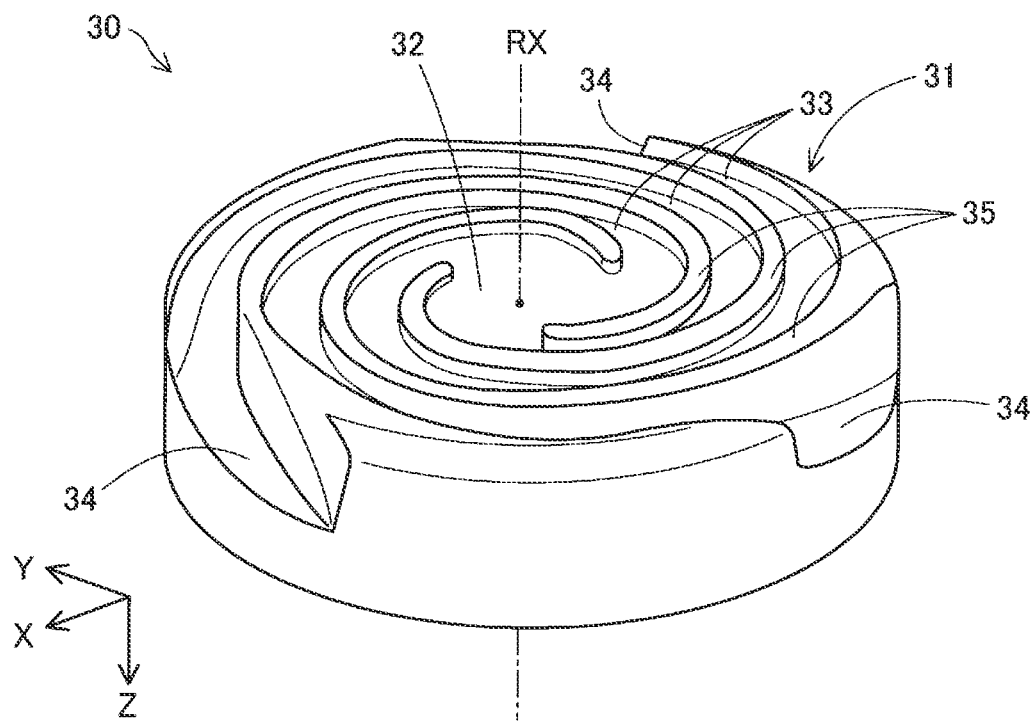
FIG. 2 is a perspective view showing a schematic configuration of a screw.

FIG. 2 is a perspective view showing a schematic configuration of the screw 30. The screw 30 has a substantially cylindrical shape in which a length in a direction along the rotation axis RX is less than a length in a direction perpendicular to the rotation axis RX. In the lower surface 31 of the screw 30, spiral grooves 33 are formed around a central portion 32. The grooves 33 communicate with material feeding ports 34 formed in a side surface of the screw 30. The material supplied from the material supply unit 11 is supplied to the grooves 33 through the material feeding ports 34. The grooves 33 are formed by being separated by ridge portions 35. Although FIG. 2 shows an example in which three grooves 33 are formed, the number of the grooves 33 may be one or two or more. A shape of the grooves 33 is not limited to a spiral shape, and may be a helical shape or an involute curve shape, or may be a shape extending in an arc from the central portion 32 toward an outer periphery.

Figure 3:
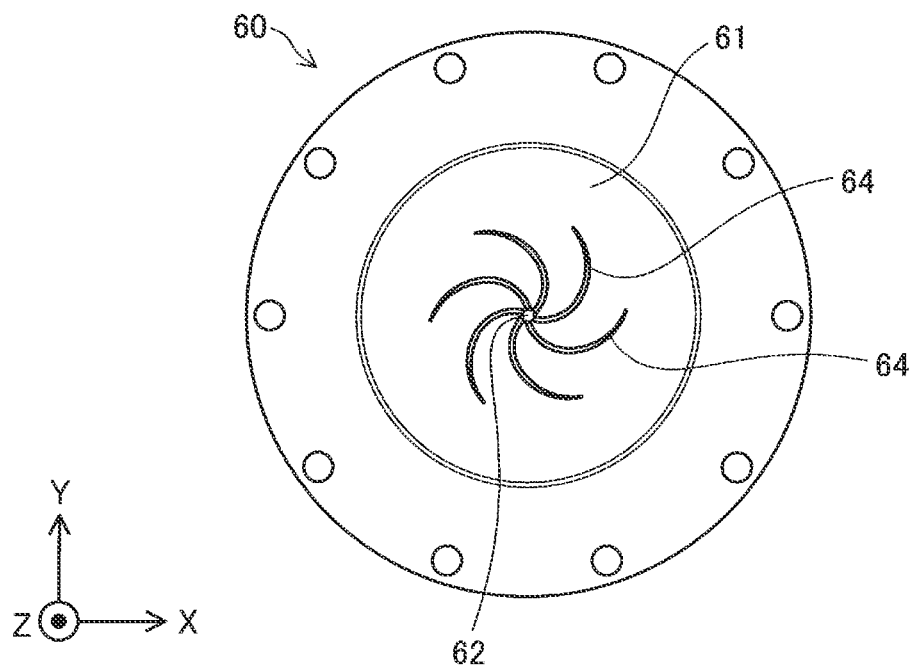
FIG. 3 is a schematic plan view of a barrel.

FIG. 3 is a schematic plan view of the barrel 60. A plurality of guide grooves 64 are formed around the communication hole 62 in the facing surface 61. The guide grooves 64 each have one end coupled to the communication hole 62, and spirally extend from the communication hole 62 toward an outer periphery of the facing surface 61. The one end of the guide groove 64 may not be coupled to the communication hole 62. Further, the guide grooves 64 may not be formed in the barrel 60.

The material supplied to the grooves 33 of the screw 30 flows along the grooves 33 while being plasticized in the grooves 33 and is guided to the central portion 32 of the screw 30 as the shaping material by the rotation of the screw 30 and heating of the plasticization heater 63. The paste-shaped shaping material that flows into the central portion 32 and that has the fluidity is supplied to the discharge unit 13 via the communication hole 62. In the plasticization unit 12, not all types of substances constituting the shaping material may be plasticized. The shaping material may be converted into a state having the fluidity as a whole by plasticizing at least some types of substances among the substances constituting the shaping material.

The discharge unit 13 discharges the shaping material. The discharge unit 13 includes a nozzle 71, the flow path 72, a discharge adjustment unit 73, and a suction unit 74.

The nozzle 71 is coupled to the communication hole 62 of the barrel 60 through the flow path 72. The nozzle 71 discharges the shaping material generated in the plasticization unit 12 from a nozzle opening 75 at a tip of the nozzle 71 toward the table 330.

The discharge adjustment unit 73 adjusts an opening area of the flow path 72. In the embodiment, the discharge adjustment unit 73 is implemented by a butterfly valve. The butterfly valve is also called a valve. The butterfly valve is provided in a processed part of a drive shaft that is partially processed. The drive shaft is provided such that the butterfly valve is located at a position where the drive shaft and the flow path 72 intersect. The butterfly valve is rotatably disposed in the flow path 72. A shape of the butterfly valve may be any shape as long as the opening area of the flow path 72 is adjusted by rotating in the flow path 72, and may be, for example, a plate shape or a hemispherical shape. The discharge adjustment unit 73 is controlled by the control unit 310. The control unit 310 adjusts a flow rate of the shaping material flowing from the plasticization unit 12 to the nozzle 71, that is, the flow rate of the shaping material discharged from the nozzle 71 by controlling a rotation angle of the butterfly valve. The discharge adjustment unit 73 adjusts the flow rate of the shaping material and controls ON/OFF of an outflow of the shaping material.

In the flow path 72, the suction unit 74 is coupled between the discharge adjustment unit 73 and the nozzle opening 75. The suction unit 74 temporarily suctions the shaping material in the flow path 72 when the discharge of the shaping material from the nozzle 71 is stopped, thereby preventing a tailing phenomenon in which the shaping material drips from the nozzle opening 75 like pulling a thread. The suction unit 74 is implemented by a plunger and is controlled by the control unit 310.

The table 330 is disposed at a position facing the nozzle opening 75 of the nozzle 71. The three-dimensional shaping device 300 shapes the three-dimensional shaped object by discharging the shaping material from the nozzle 71 onto a shaping surface 331 that is an upper surface of the table 330 to laminate shaping layers.

The position change unit 340 changes a relative position between the nozzle 71 and the table 330. In the embodiment, the position change unit 340 moves the table 330 with respect to the nozzle 71 whose position is fixed. A change in the relative position of the nozzle 71 with respect to the table 330 is also simply referred to as movement of the nozzle 71. The position change unit 340 is implemented by a three-axis positioner that moves the table 330 in three axial directions including the X, Y, and Z directions by a driving force of three motors. The motors of the position change unit 340 are driven under the control of the control unit 310. The position change unit 340 may move the nozzle 71 in a state in which a position of the table 330 is fixed instead of moving the table 330. Further, the position change unit 340 may move both the table 330 and the nozzle 71.

The control unit 310 is a control device that controls an overall operation of the three-dimensional shaping device. The control unit 310 is implemented by a computer including one or a plurality of processors, a memory, and an input and output interface for inputting and outputting signals to and from an outside. The control unit 310 exerts various functions such as a function of executing shaping processing for shaping a three-dimensional shaped object by a processor executing a program or a command read from a main storage device. Instead of being implemented by the computer, the control unit 310 may be implemented by a configuration of combining a plurality of circuits for implementing at least a part of the functions.

Figure 4:
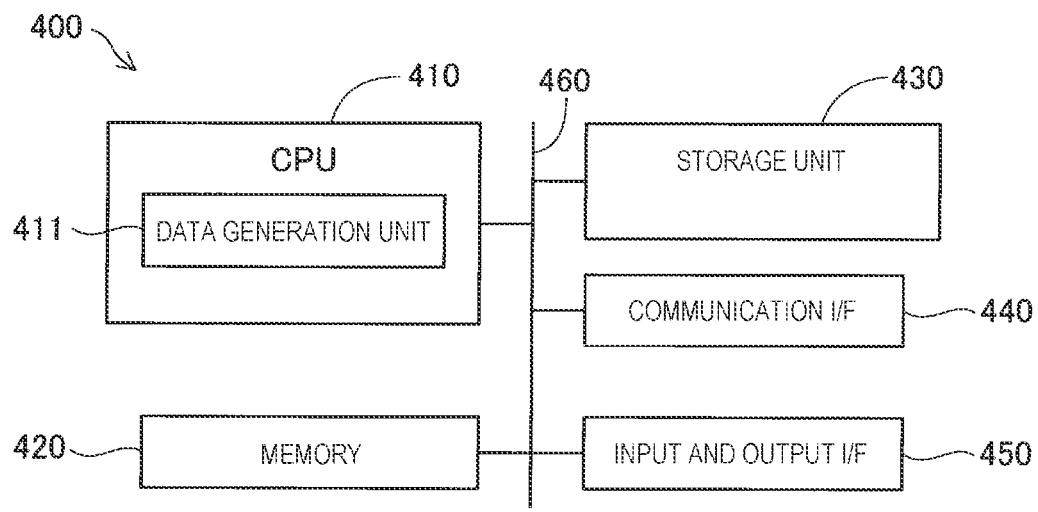
FIG. 4 is an explanatory diagram showing a schematic configuration of an information processing apparatus.

FIG. 4 is an explanatory diagram showing a schematic configuration of the information processing apparatus 400. The information processing apparatus 400 is implemented as a computer in which a CPU 410, a memory 420, a storage device 430, a communication interface 440, and an input and output interface 450 are coupled to one another by a bus 460. The information processing apparatus 400 is coupled to the control unit 310 of the three-dimensional shaping device 300 via the communication interface 440.

The CPU 410 functions as a data generation unit 411 by executing a program stored in the storage device 430.

The data generation unit 411 generates shaping data that is data for shaping the three-dimensional shaped object. The shaping data includes path data representing a movement path of the nozzle 71 and discharge amount data representing an amount of the shaping material discharged on the movement path for each layer obtained by slicing a shape of the three-dimensional shaped object into a plurality of pieces. The movement path of the nozzle 71 is a path in which the nozzle 71 relatively moves along the shaping surface 331 of the table 330.

The information processing apparatus 400 transmits the shaping data generated by the data generation unit 411 to the control unit 310 of the three-dimensional shaping device 300. The control unit 310 controls the discharge unit 13 and a movement mechanism according to the received shaping data to discharge the shaping material and laminate layers ML in the lamination direction, thereby shaping the three-dimensional shaped object on the table 330. In the embodiment, the lamination direction is a +Z direction.

Figure 5:
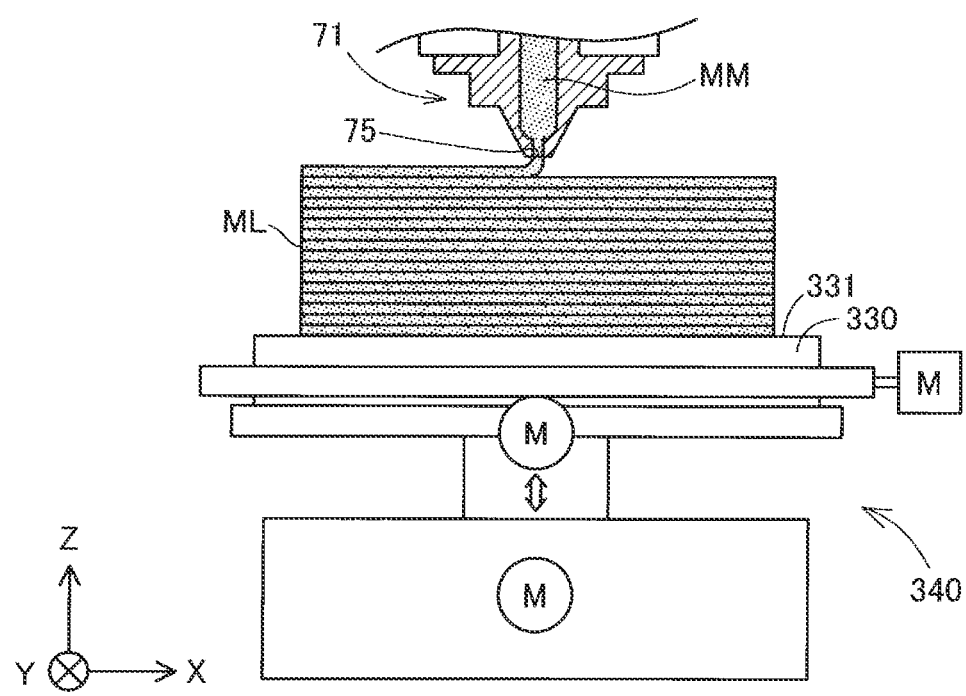
FIG. 5 is an explanatory view schematically showing a state in which a three-dimensional shaping device shapes a shaped object.

FIG. 5 is an explanatory view schematically showing a state in which the three-dimensional shaping device 300 shapes the shaped object. In the three-dimensional shaping device 300, as described above, in the plasticization unit 12, the material in the solid state supplied to the grooves 33 of the rotating screw 30 is plasticized to generate a shaping material MM. While maintaining a distance between the shaping surface 331 on the table 330 and the nozzle 71, the control unit 310 causes the nozzle 71 to discharge the shaping material MM while controlling the position change unit 340 to change a position of the nozzle 71 with respect to the table 330 in a direction along the shaping surface 331. The shaping material MM discharged from the nozzle 71 is continuously deposited in a movement direction of the nozzle 71 to form the layer ML. After forming one layer ML, the control unit 310 lowers the table 330 to relatively move the position of the nozzle 71 with respect to the table 330 in the +Z direction. Then, the three-dimensional shaped object is formed by further laminating layers ML on the layers ML formed so far.

For example, the control unit 310 temporarily interrupts the discharge of the shaping material MM from the nozzle 71 when the nozzle 71 is moved in the Z direction after formation of one layer ML is completed or when there are a plurality of independent shaping regions in each layer. In this case, the control unit 310 causes the discharge adjustment unit 73 to close the flow path 72, stops the discharge of the shaping material MM from the nozzle opening 75, and causes the suction unit 74 to temporarily suction the shaping material MM in the nozzle 71. After changing the position of the nozzle 71, the control unit 310 causes the discharge adjustment unit 73 to open the flow path 72 while discharging the shaping material MM in the suction unit 74, thereby restarting the deposition of the shaping material MM from a changed position of the nozzle 71.

Figure 6:
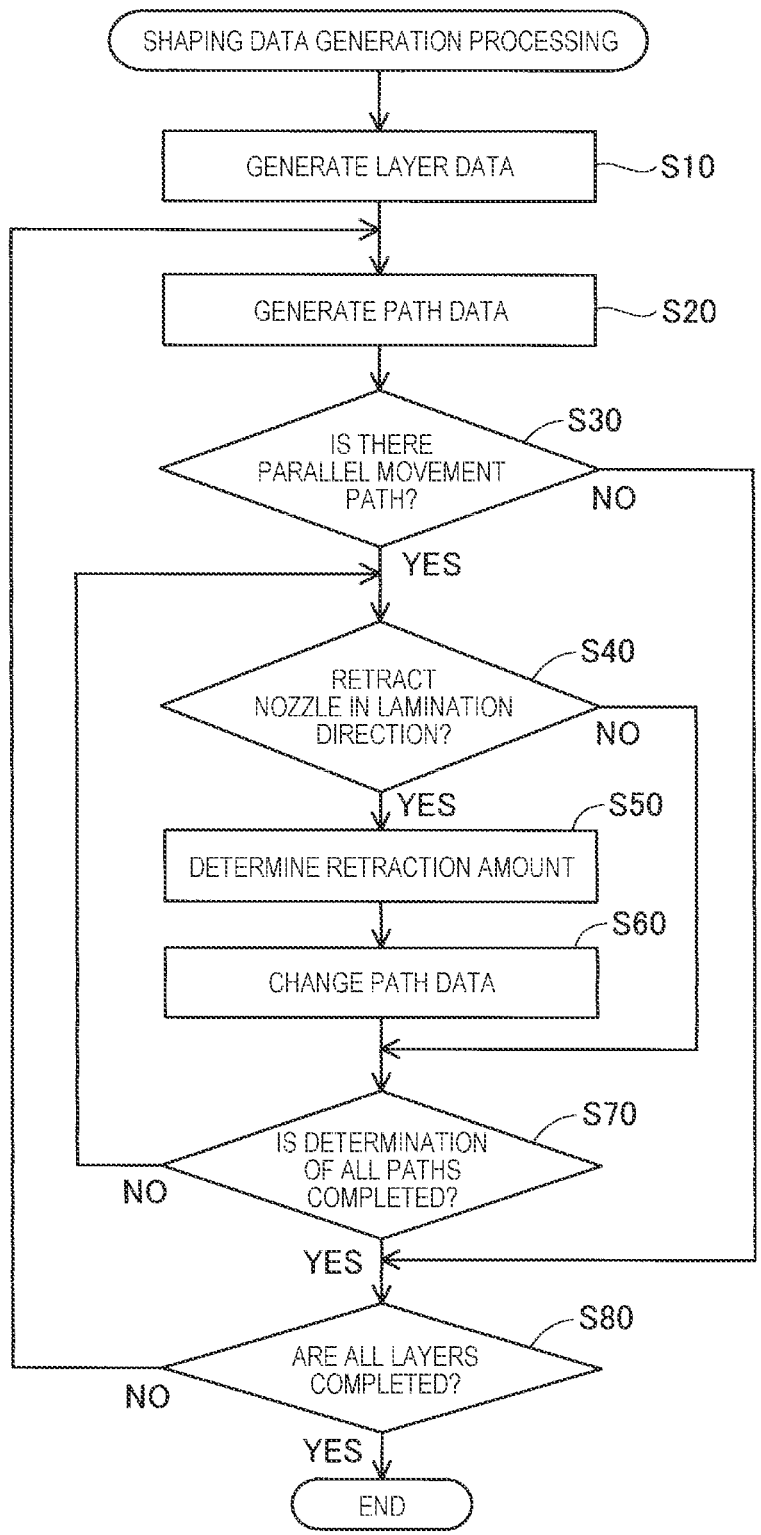
FIG. 6 is a flowchart of shaping data generation processing.

FIG. 6 is a flowchart of shaping data generation processing executed in the information processing apparatus 400. First, in step S10, the data generation unit 411 analyzes three-dimensional CAD data and the like of the three-dimensional shaped object, and generates layer data obtained by slicing the three-dimensional shaped object into a plurality of the layers ML along an XY plane. The layer data is data representing an outline of the three-dimensional shaped object in the XY plane.

In step S20, the data generation unit 411 generates, based on the layer data of the specific layer ML, the path data and the discharge amount data for forming the layer ML.

Figure 7:
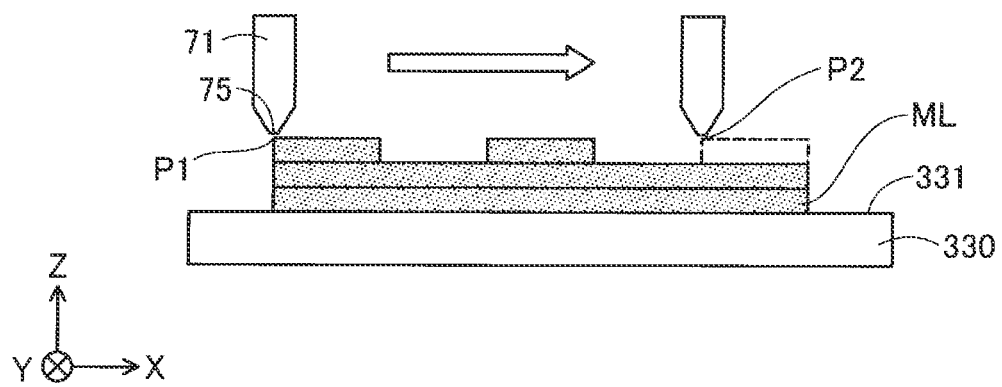
FIG. 7 is a view showing a parallel movement path.

In step S30, the data generation unit 411 determines whether a parallel movement path is included in the path data in the specific layer ML generated in step S20. FIG. 7 is a view showing the parallel movement path. The parallel movement path means a path in which the nozzle 71 is moved along the layer ML of the shaping material laminated on the table 330 from a discharge stop position P1 to a discharge restart position P2 that is located in the same layer ML as the discharge stop position P1 and at which the discharge of the shaping material is restarted after the discharge of the shaping material from the nozzle 71 is stopped at the discharge stop position P1. In FIG. 7, the layer ML to be shaped at the discharge restart position P2 is indicated by a broken line.

If it is determined in step S30 that the parallel movement path is included in the path data, in step S40, the data generation unit 411 determines whether to retract the nozzle 71 in the lamination direction according to a shaping condition of the three-dimensional shaped object when the nozzle 71 is moved from the discharge stop position P1 to the discharge restart position P2. In the embodiment, the shaping condition includes a condition relating to a distance between the discharge stop position P1 and the discharge restart position P2. In the embodiment, the data generation unit 411 determines to retract the nozzle 71 in the lamination direction when the distance between the discharge stop position P1 and the discharge restart position P2 is equal to or greater than a predetermined value.

If it is determined in step S40 that the nozzle 71 is retracted in the lamination direction, in step S50, the data generation unit 411 determines a retraction amount that is a movement distance of the nozzle 71 in the lamination direction according to the shaping condition. For example, the data generation unit 411 determines the retraction amount such that the retraction amount increases as the distance between the discharge stop position P1 and the discharge restart position P2 increases.

Figure 8:
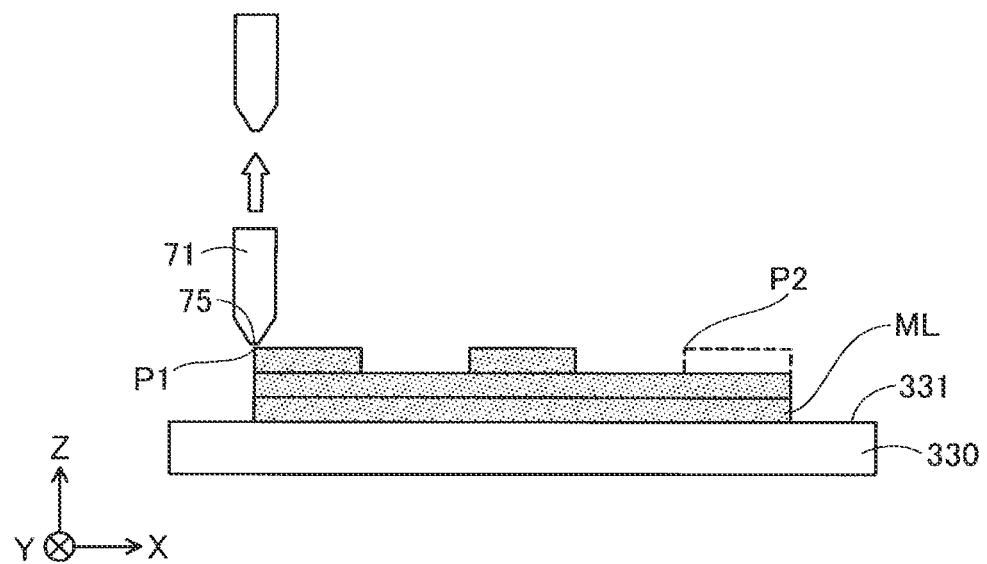
FIG. 8 is a view showing a movement path of a nozzle in changed path data.

In step S60, the data generation unit 411 changes the path data generated in step S20 to retract the nozzle 71 from the discharge stop position P1 in the lamination direction according to the retraction amount determined in step S50. Specifically, the data generation unit 411 adds a path along which the nozzle 71 is moved in the lamination direction according to the retraction amount without discharging the shaping material from the nozzle 71 before and after the parallel movement path. The data generation unit 411 adds a path along which the nozzle 71 is moved in the +Z direction immediately before moving the nozzle 71 along the layer ML of the shaping material and a path along which the nozzle 71 is moved in a −Z direction immediately after moving the nozzle 71 along the layer ML of the shaping material. FIGS. 8 to 10 are views showing movement paths of the nozzle 71 in the changed path data. In the path data before the change, as shown in FIG. 7, the nozzle 71 is moved along the layers ML of the shaping material laminated on the table 330 from the discharge stop position P1 to the discharge restart position P2. In the changed path data, first, as shown in FIG. 8, the nozzle 71 is moved from the discharge stop position P1 in the +Z direction by the retraction amount. Next, as shown in FIG. 9, the nozzle 71 is moved to a position above the discharge restart position P2 along the layers ML of the shaping material laminated on the table 330. At this time, the nozzle 71 is moved in the XY plane. Finally, as shown in FIG. 10, the nozzle 71 is moved in the −Z direction by the same distance as the retraction amount from the position above the discharge restart position P2 to the discharge restart position P2.

After step S60 or if it is determined in step S40 that the nozzle 71 is not retracted in the lamination direction, step S70 is executed. In step S70, the data generation unit 411 determines whether step S40 is executed for all the parallel movement paths in the specific layer ML, that is, whether it is determined whether to retract the nozzle 71 in the lamination direction. If there is a parallel movement path for which it is not determined whether to retract the nozzle 71 in the lamination direction, the data generation unit 411 returns the processing to step S40.

If it is determined in step S70 that the determination as to whether to retract the nozzle 71 in the lamination direction is performed for all the parallel movement paths in the specific layer ML, or if it is determined in step S30 that the parallel movement path is not included in the path data in the specific layer ML, step S80 is executed. In step S80, the data generation unit 411 determines whether the path data and the discharge amount data for each layer ML are generated based on the layer data of all the layers ML. If there is a layer ML in which the path data and the discharge amount data are not generated, the data generation unit 411 returns the processing to step S20. If the path data and the discharge amount data are generated for all the layers ML, the shaping data generation processing is ended.

Figure 11:
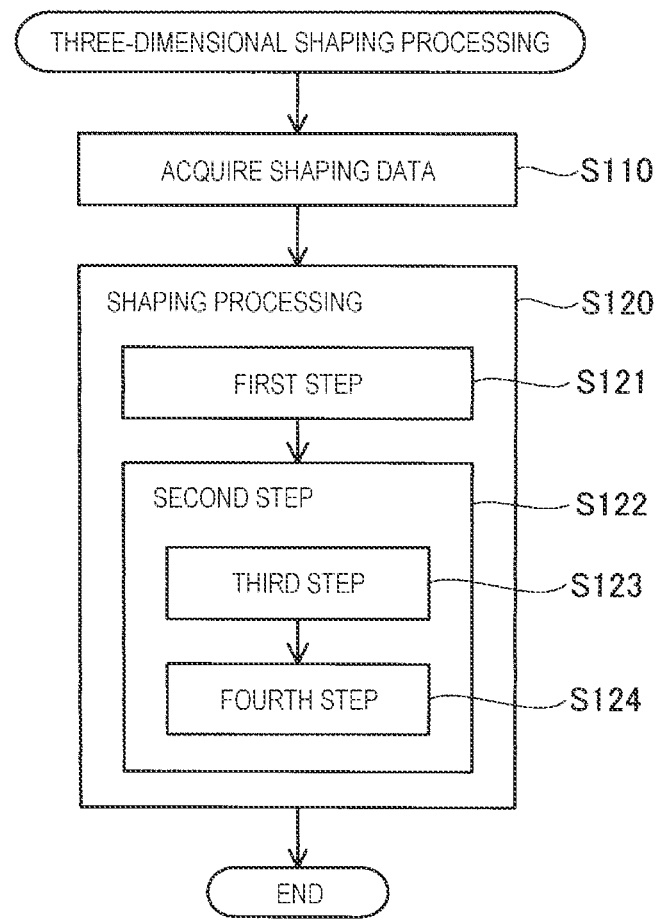
FIG. 11 is a process chart of shaping processing executed in the three-dimensional shaping system.

FIG. 11 is a process chart of the shaping processing executed in the three-dimensional shaping system 100. First, in step S110, the control unit 310 of the three-dimensional shaping device 300 acquires the shaping data generated by the information processing apparatus 400.

In step S120, the control unit 310 of the three-dimensional shaping device 300 shapes the three-dimensional shaped object by discharging the shaping material from the discharge unit 13 and laminating the layers ML of the shaping material on the table 330 according to the shaping data. If it is determined in step S40 in FIG. 6 that the nozzle 71 is retracted in the lamination direction, step S121 and step S122 are executed in step S120 in FIG. 11 by the control unit 310 shaping the three-dimensional shaped object according to the shaping data. If step S121 and step S122 are executed, step S121 and step S122 may be executed a plurality of times instead of once.

In step S121, the discharge of the shaping material from the nozzle 71 is stopped. Step S121 is also referred to as a first step.

In step S122, the nozzle 71 is moved from the discharge stop position P1 to the discharge restart position P2 located in the same layer ML as the discharge stop position P1. Step S122 is also referred to as a second step. Step S122 includes step S123 and step S124.

In step S123, the nozzle 71 is retracted from the discharge stop position P1 in the lamination direction according to the retraction amount. Step S123 is also referred to as a third step.

In step S124, after the nozzle 71 is retracted in the lamination direction in step S123, the nozzle 71 is moved to the position above the discharge restart position P2 along the layers ML of the shaping material. Step S124 is also referred to as a fourth step.

According to the first embodiment described above, when the parallel movement path is included in the path data, the data generation unit 411 determines, according to the shaping condition of the three-dimensional shaped object, whether to retract the nozzle 71 in the lamination direction when moving the nozzle 71 from the discharge stop position P1 to the discharge restart position P2. When the data generation unit 411 determines to retract the nozzle 71 in the lamination direction, the data generation unit 411 determines the retraction amount according to the shaping condition, and changes the path data to retract the nozzle 71 from the discharge stop position P1 in the lamination direction according to the retraction amount. Therefore, when the nozzle 71 is moved from the discharge stop position P1 to the discharge restart position P2 located in the same layer ML as the discharge stop position P1, the nozzle 71 can be prevented from coming into contact with a part of the three-dimensional shaped object which has already been shaped.

In the embodiment, the shaping condition is the condition relating to the distance between the discharge stop position P1 and the discharge restart position P2, and the nozzle 71 is retracted in the lamination direction when the distance between the discharge stop position P1 and the discharge restart position P2 is equal to or greater than the predetermined value. When the distance between the discharge stop position P1 and the discharge restart position P2 is small, there is a low possibility that there is a part of the three-dimensional shaped object which has been already shaped between the discharge stop position P1 and the discharge restart position P2. Therefore, when the distance between the discharge stop position P1 and the discharge restart position P2 is small, there is no need to retract the nozzle 71, and unnecessary movement of the nozzle 71 can be reduced.

B. Second Embodiment

In a second embodiment, a shaping condition is different from that according to the first embodiment. The shaping condition according to the second embodiment includes a condition relating to a height of the discharge stop position P1 in a lamination direction and the number of layers ML laminated below the discharge stop position P1.

Figure 12:
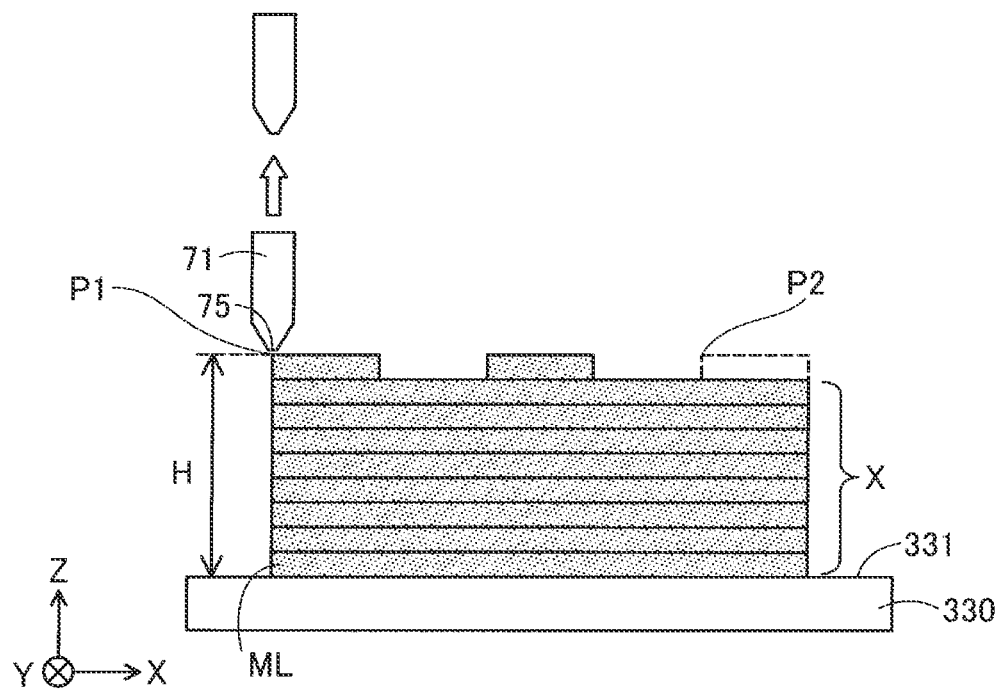
FIG. 12 is a view showing retraction of a nozzle in a lamination direction according to a second embodiment.

FIG. 12 is a view showing retraction of the nozzle 71 in the lamination direction according to the second embodiment. In the second embodiment, when a height H of the discharge stop position P1 in the lamination direction is equal to or greater than a predetermined value, or when the number X of the layers ML laminated below the discharge stop position P1 is equal to or greater than a predetermined value, the data generation unit 411 determines to retract the nozzle 71 in the lamination direction in step S40 in FIG. 6. Here, the height H of the discharge stop position P1 in the lamination direction is a distance between the discharge stop position P1 and the shaping surface 331 of the table 330 in the Z direction.

As a height of a three-dimensional shaped object increases and as the number of laminated layers increases, the three-dimensional shaped object is more likely to be affected by a shaping accuracy and shaking of the three-dimensional shaped object itself. As a result, as the height increases and as the number of laminated layers increases, a possibility increases that there is a part of the actually shaped three-dimensional shaped object at a position where there is no three-dimensional shaped object in layer data.

According to the second embodiment, when the height H of the discharge stop position P1 in the lamination direction is equal to or greater than the predetermined value, or when the number X of the layers ML laminated below the discharge stop position P1 is equal to or greater than the predetermined value, the nozzle 71 is retracted in the lamination direction. Therefore, even when there is a part of the three-dimensional shaped object at the position where there is no three-dimensional shaped object in the layer data, a possibility of contact between the three-dimensional shaped object and the nozzle 71 can be reduced.

C. Third Embodiment

A shaping condition according to a third embodiment is the same as that according to the second embodiment. The third embodiment differs from the second embodiment in a method for determining a retraction amount of the nozzle 71.

Figure 13:
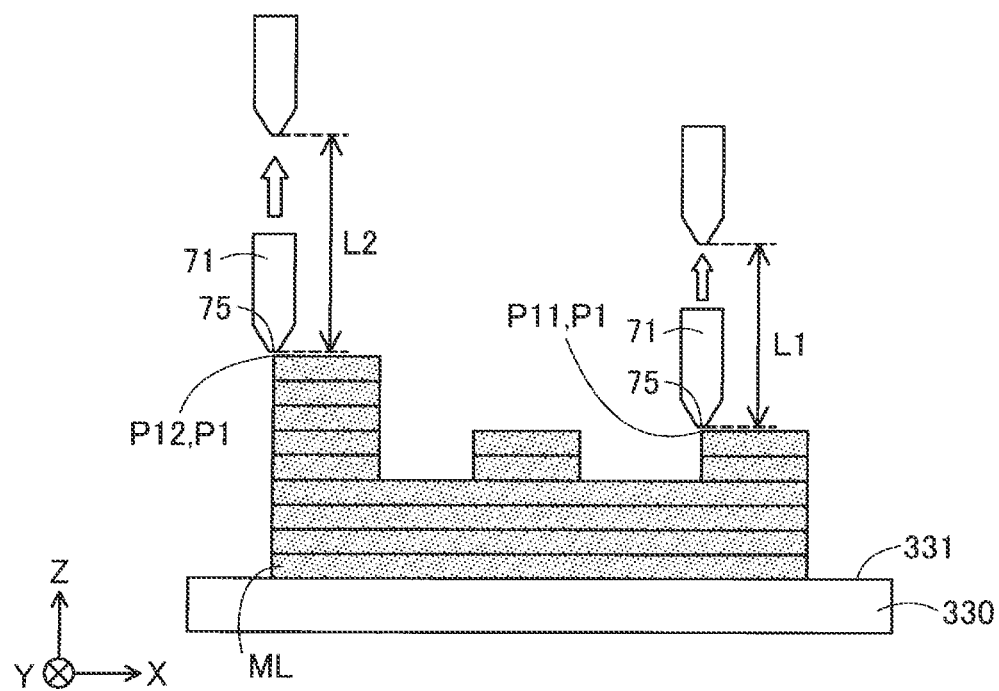
FIG. 13 is a view showing retraction of a nozzle in a lamination direction according to a third embodiment.

FIG. 13 is a view showing retraction of the nozzle 71 in a lamination direction according to the third embodiment. In the embodiment, the discharge stop position P1 in an n-th layer among the layers ML is referred to as a first discharge stop position P11, n being a natural number, and the discharge stop position P1 in a layer ML that is higher than the n-th layer in the lamination direction is referred to as a second discharge stop position P12. When there is the first discharge stop position P11 and the second discharge stop position P12, in step S50 in FIG. 6, the data generation unit 411 determines the retraction amount such that a retraction amount L2 at the second discharge stop position P12 is larger than a retraction amount L1 at the first discharge stop position P11.

Since the second discharge stop position P12 is located in the layer ML higher than the first discharge stop position P11, for the same reason as that described in the second embodiment, there is a higher possibility that there is a part of an actually shaped three-dimensional shaped object at a position where there is no three-dimensional shaped object in the layer data in the layer ML having the second discharge stop position P12 than the layer ML having the first discharge stop position P11. According to the third embodiment, the retraction amount is determined such that the retraction amount L2 at the second discharge stop position P12 is larger than the retraction amount L1 at the first discharge stop position P11. Therefore, even when there is a part of the three-dimensional shaped object at the position where there is no three-dimensional shaped object in the layer data, a possibility of contact between the three-dimensional shaped object and the nozzle 71 can be reduced.

D. Fourth Embodiment

In a fourth embodiment, a shaping condition is different from that according to the first embodiment. The shaping condition according to the fourth embodiment includes a condition relating to a shape of a three-dimensional shaped object in a movement range of the nozzle 71 from the discharge stop position P1 to the discharge restart position P2.

Figure 14:
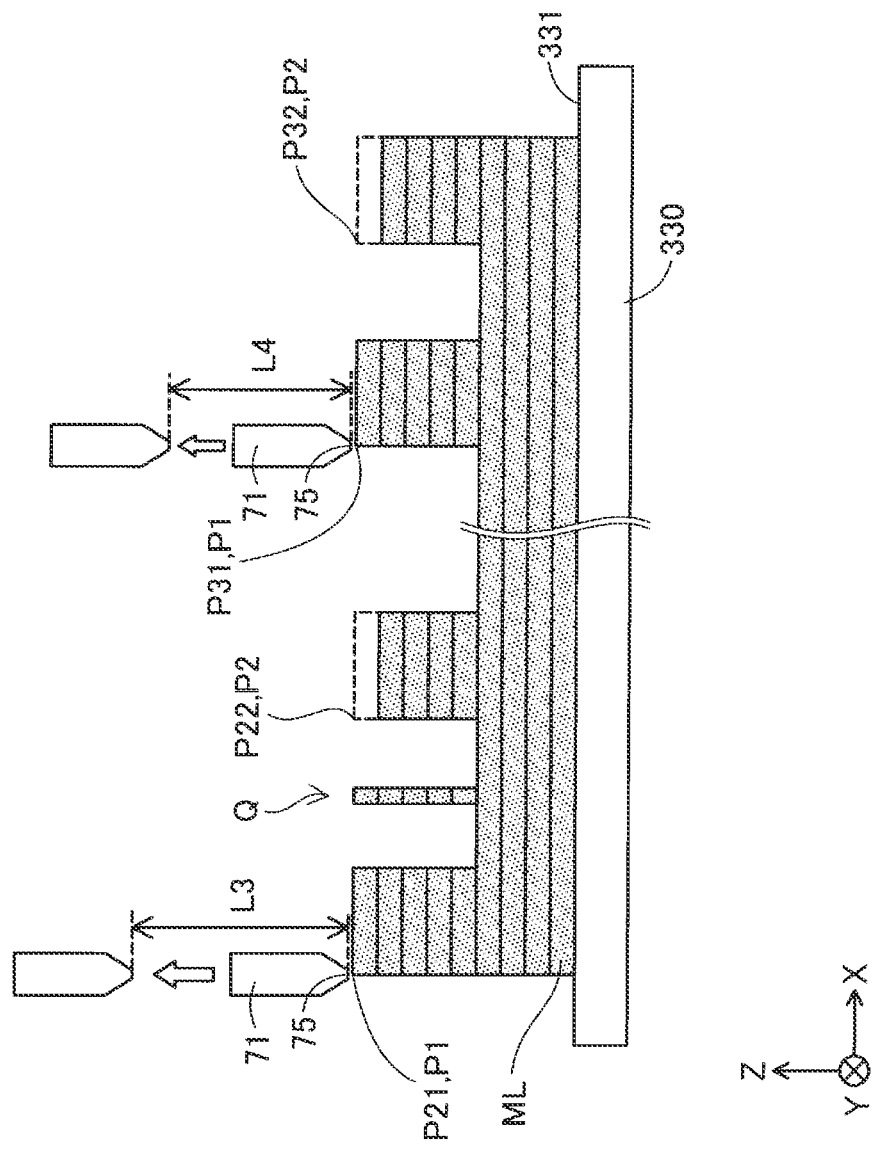
FIG. 14 is a view showing retraction of a nozzle in a lamination direction according to a fourth embodiment.

FIG. 14 is a view showing retraction of the nozzle 71 in a lamination direction according to the fourth embodiment. In the fourth embodiment, in step S50 in FIG. 6, the data generation unit 411 determines a retraction amount such that the retraction amount when a part of the three-dimensional shaped object having a shape protruding in the lamination direction is located in the movement range of the nozzle 71 from the discharge stop position P1 to the discharge restart position P2 is larger than a retraction amount when a part of the three-dimensional shaped object having the shape protruding in the lamination direction is not located in the movement range of the nozzle 71. Here, the shape protruding in the lamination direction is, for example, a cuboid or a conical shape having a length in the lamination direction larger than a length in a direction perpendicular to the lamination direction.

FIG. 14 shows a retraction amount L3 when a part Q of a three-dimensional shaped object having a shape protruding in the lamination direction is located in a movement range of the nozzle 71 from a discharge stop position P21 to a discharge restart position P22, and a retraction amount L4 when the part Q of the three-dimensional shaped object having the shape protruding in the lamination direction is not located in a movement range of the nozzle 71 from a discharge stop position P31 to a discharge restart position P32. In step S50 in FIG. 6, the data generation unit 411 determines the retraction amount such that the retraction amount L3 is larger than the retraction amount L4. Hereinafter, the part Q of the three-dimensional shaped object having the shape protruding in the lamination direction is also simply referred to as a protruding part Q.

Since the protruding part Q easily swings, when the protruding part Q is located in the movement range of the nozzle 71 from the discharge stop position P1 to the discharge restart position P2, the protruding part Q may come into contact with the nozzle 71. According to the fourth embodiment, the data generation unit 411 determines the retraction amount such that a retraction amount when the protruding part Q is located in the movement range of the nozzle 71 from the discharge stop position P1 to the discharge restart position P2 is larger than a retraction amount when the protruding part Q is not located in the movement range of the nozzle 71. Therefore, even when the three-dimensional shaped object swings while the nozzle 71 moves from the discharge stop position P1 to the discharge restart position P2, it is possible to reduce a possibility that the protruding part Q comes into contact with the nozzle 71.

E. Fifth Embodiment

In a fifth embodiment, a shaping condition is different from that according to the first embodiment. The shaping condition according to the fifth embodiment includes a condition relating to a structural position of a three-dimensional shaped object in a part where shaping is performed.

Figure 15:
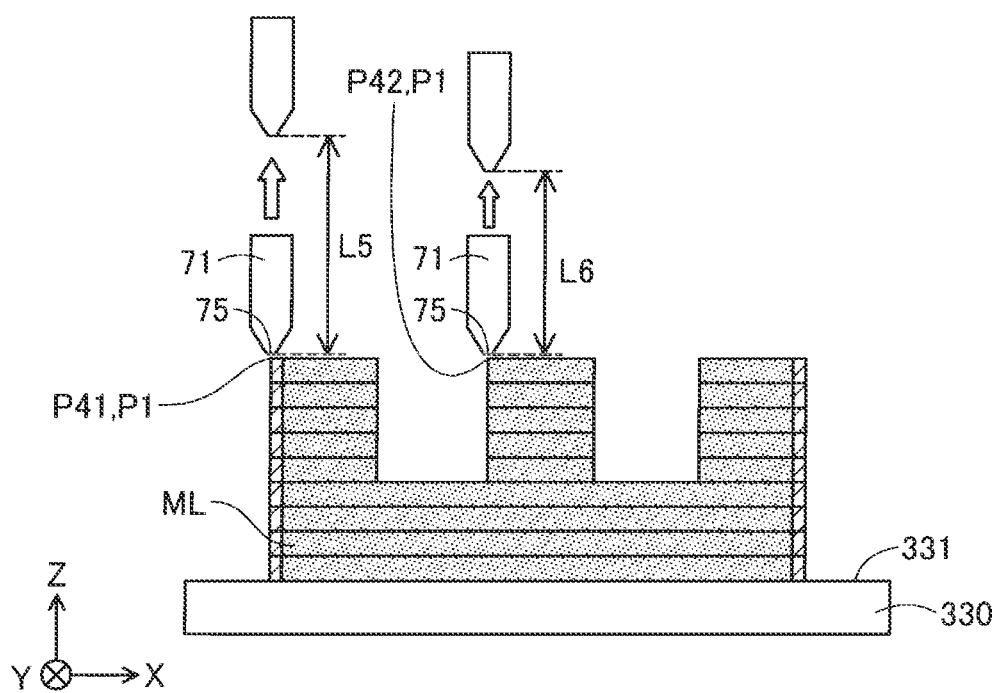
FIG. 15 is a view showing retraction of a nozzle in a lamination direction according to a fifth embodiment.

FIG. 15 is a view showing retraction of the nozzle 71 in a lamination direction according to the fifth embodiment. In the fifth embodiment, in step S50 in FIG. 6, the data generation unit 411 determines a retraction amount such that a retraction amount for shaping an outline of the three-dimensional shaped object is larger than a retraction amount for shaping an inner region of the three-dimensional shaped object. Here, the outline of the three-dimensional shaped object means a part located on the outline of the three-dimensional shaped object on which the shaping is completed. The inner region of the three-dimensional shaped object means a part located in the three-dimensional shaped object on which the shaping is completed. The inner region is also called an infill. To clearly show a part corresponding to the outline of the three-dimensional shaped object, the outline of the three-dimensional shaped object is hatched with diagonal lines in FIG. 15. In addition, FIG. 15 shows a retraction amount L5 at a discharge stop position P41 located on the outline of the three-dimensional shaped object and a retraction amount L6 at a discharge stop position P42 located in the inner region of the three-dimensional shaped object. In step S50 in FIG. 6, the data generation unit 411 determines the retraction amount such that the retraction amount L5 is larger than the retraction amount L6.

According to the fifth embodiment described above, the retraction amount is determined such that the retraction amount L5 for shaping the outline of the three-dimensional shaped object is larger than the retraction amount L6 for shaping the inner region of the three-dimensional shaped object. Therefore, a possibility of contact between the outline of the three-dimensional shaped object and the nozzle 71 can be made lower than a possibility of contact between the inner region of the three-dimensional shaped object and the nozzle 71. Therefore, it is possible to prevent a decrease in a shaping accuracy of the outline of the three-dimensional shaped object on which the shaping is completed due to the contact between the outline of the three-dimensional shaped object and the nozzle 71. Since the outline of the three-dimensional shaped object affects an appearance of the three-dimensional shaped object, a quality of the three-dimensional shaped object can be improved as a result.

F. Sixth Embodiment

Figure 16:
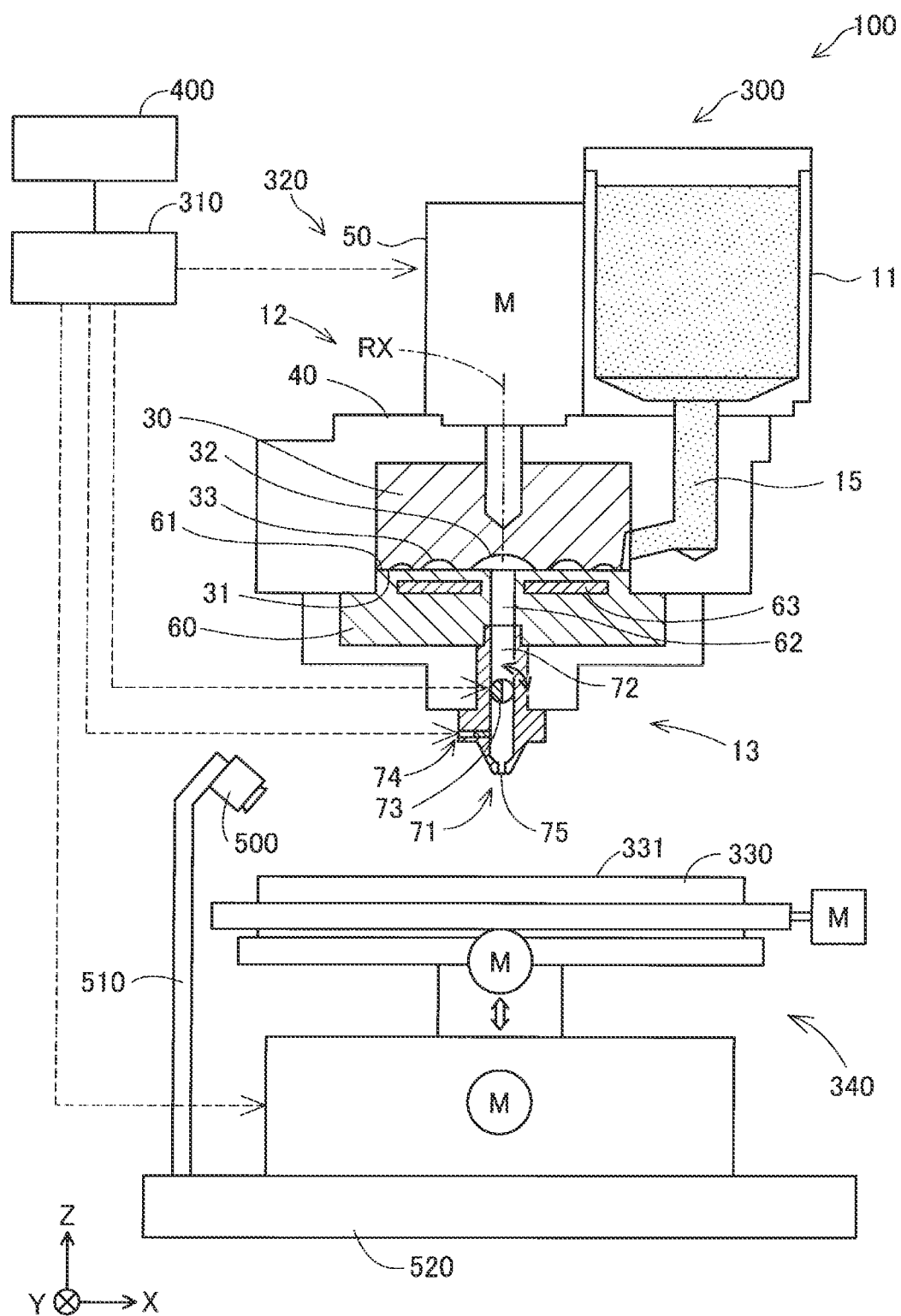
FIG. 16 is an explanatory view showing a schematic configuration of a three-dimensional shaping system according to a sixth embodiment.

FIG. 16 is an explanatory view showing a schematic configuration of the three-dimensional shaping system 100 according to a sixth embodiment. In the sixth embodiment, the three-dimensional shaping device 300 includes a temperature measurement unit 500. The temperature measurement unit 500 is supported by a support unit 510. The support unit 510 is fixed to a base portion 520 that supports the position change unit 340. The temperature measurement unit 500 measures temperatures of the layers ML of a shaping material laminated on the table 330. The temperature measurement unit 500 is, for example, thermography that measures temperatures of all of the layers ML of the shaping material.

Figure 17:
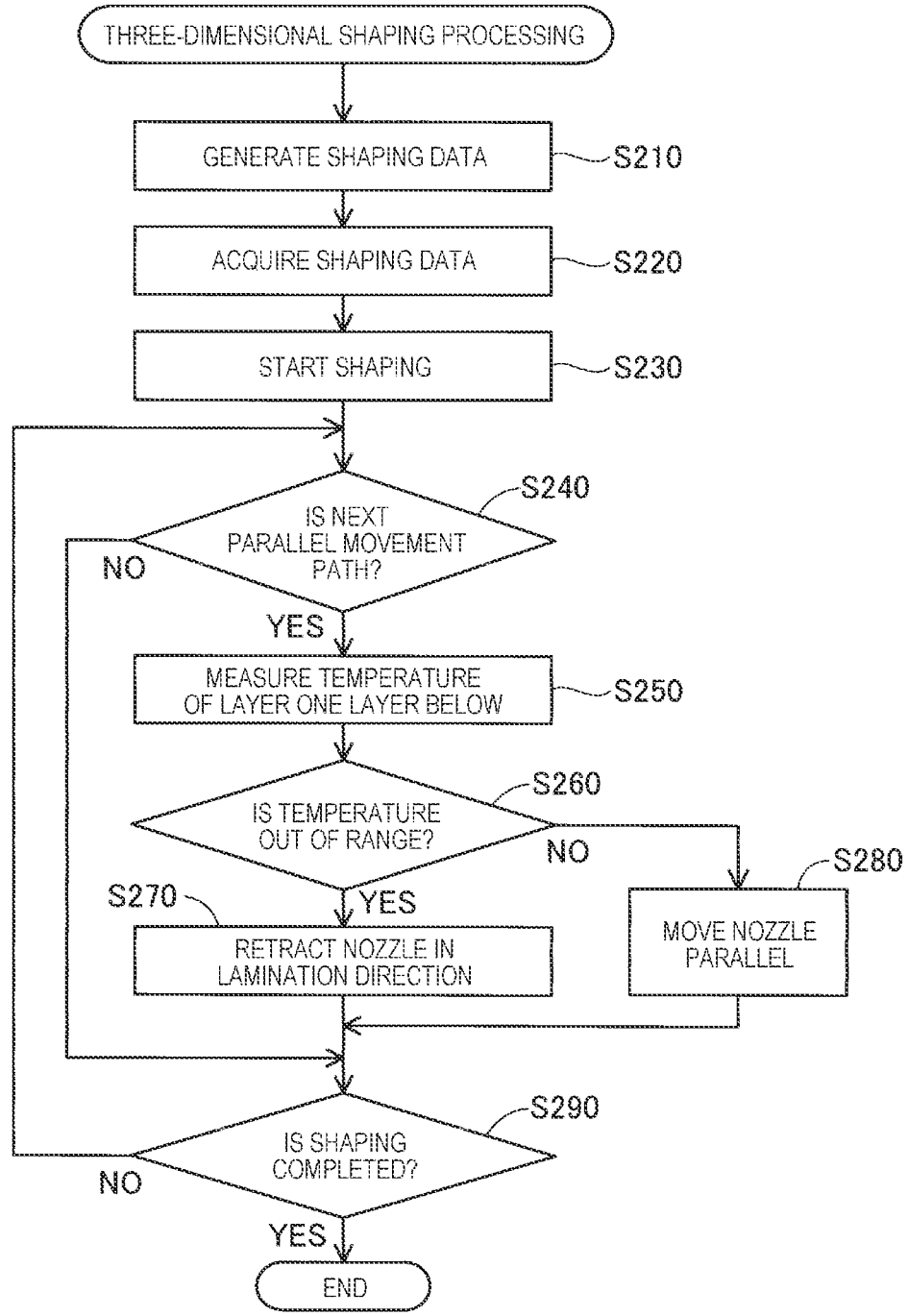
FIG. 17 is a process chart of shaping processing executed in the three-dimensional shaping system according to the sixth embodiment.

FIG. 17 is a process chart of shaping processing executed in the three-dimensional shaping system 100 according to the sixth embodiment. First, in step S210, the data generation unit 411 analyzes three-dimensional CAD data and the like of a three-dimensional shaped object to generate layer data, and generates shaping data including path data and discharge amount data for shaping each layer ML based on the layer data of each layer ML.

In step S220, the control unit 310 of the three-dimensional shaping device 300 acquires the shaping data generated by the data generation unit 411.

In step S230, the control unit 310 starts shaping the three-dimensional shaped object by discharging the shaping material from the discharge unit 13 and laminating the layers ML of the shaping material on the table 330 according to the shaping data.

In step S240, the control unit 310 determines whether a movement path of the nozzle 71 to be executed next is a parallel movement path. If it is determined in step S240 that the movement path of the nozzle 71 to be executed next is the parallel movement path, step S250 is executed. If it is determined in step S240 that the movement path of the nozzle 71 to be executed next is not the parallel movement path, the control unit 310 causes the processing to proceed to step S290.

Figure 18:
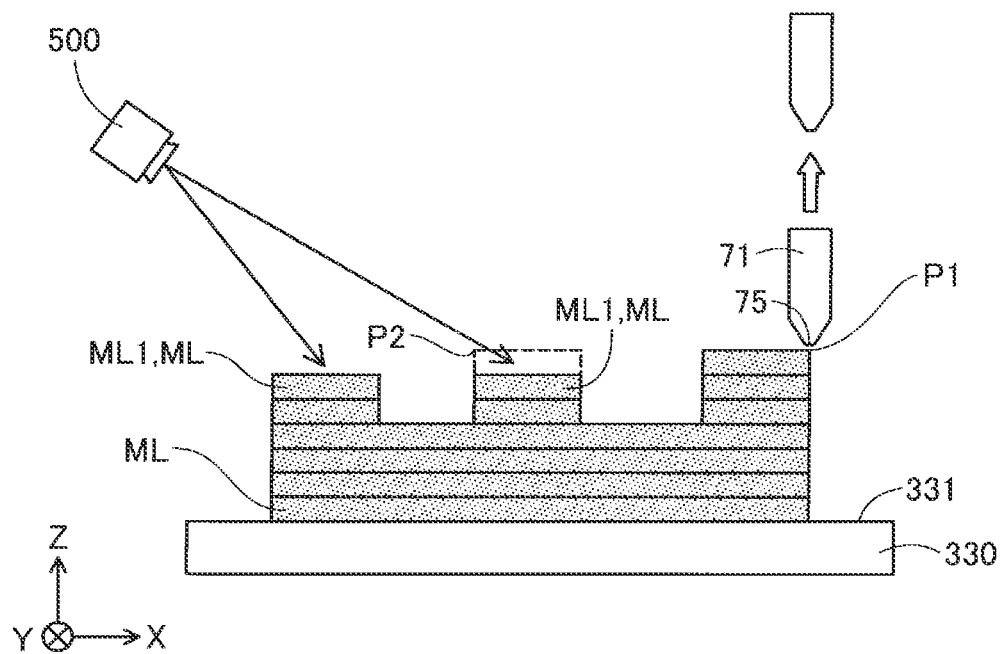
FIG. 18 is a view showing a position of a layer whose temperature is measured by a temperature measurement unit.

In step S250, the temperature measurement unit 500 measures a temperature of a layer ML located one layer below the layer ML having the discharge stop position P1 and the discharge restart position P2 of the parallel movement path to be executed next. FIG. 18 is a view showing a position of the layer ML whose temperature is measured by the temperature measurement unit 500. As shown in FIG. 18, the temperature measurement unit 500 measures a temperature of a layer ML1 located one layer below the layer ML having the discharge stop position P1 and the discharge restart position P2. Step S250 is also referred to as a temperature measurement step. A shaping condition according to the sixth embodiment includes a condition relating to the temperature of the layer ML measured in the temperature measurement step.

In step S260, the control unit 310 determines whether the temperature of the layer ML measured in the temperature measurement step is out of a predetermined range. If it is determined that the temperature of the layer ML is out of the predetermined range, in step S270, the control unit 310 retracts the nozzle 71 in a lamination direction and moves the nozzle 71 from the discharge stop position P1 to the discharge restart position P2. Specifically, first, as shown in FIG. 18, the control unit 310 moves the nozzle 71 from the discharge stop position P1 in the +Z direction by a predetermined retraction amount. Next, similarly to FIG. 9, the control unit 310 moves the nozzle 71 to a position above the discharge restart position P2 along the layers ML of the shaping material laminated on the table 330. Finally, similarly to FIG. 10, the control unit 310 moves the nozzle 71 in the −Z direction by the same distance as the predetermined retraction amount from the position above the discharge restart position P2 to the discharge restart position P2.

If it is determined in step S260 that the temperature of the layer ML is not out of the predetermined range, in step S280, the control unit 310 moves the nozzle 71 along the layer ML from the discharge stop position P1 to the discharge restart position P2 according to the parallel movement path in the path data.

In step S290, the control unit 310 determines whether the shaping of the three-dimensional shaped object is completed. If the shaping of the three-dimensional shaped object is not completed, the control unit 310 returns the processing to step S240. If the shaping of the three-dimensional shaped object is completed, the control unit 310 ends three-dimensional shaping processing.

When the temperature of the layer ML measured in the temperature measurement step is less than the predetermined range, the three-dimensional shaped object is cooled, and thus the three-dimensional shaped object is likely to warp. Further, when the temperature of the layer ML measured in the temperature measurement step is higher than the predetermined range, the three-dimensional shaped object is heated, and thus the three-dimensional shaped object is likely to swing. Therefore, when the temperature of the layer ML measured in the temperature measurement step is out of the predetermined range, there is a high possibility that there is a part of the actually shaped three-dimensional shaped object at a position where there is no three-dimensional shaped object in the layer data.

According to the sixth embodiment, when the temperature of the layer ML measured in the temperature measurement step is out of the predetermined range, the control unit 310 retracts the nozzle 71 in the lamination direction. Therefore, even when the three-dimensional shaped object is deformed by being cooled or even when the three-dimensional shaped object is likely to swing by being heated, it is possible to reduce a possibility that the three-dimensional shaped object and the nozzle 71 come into contact with each other during the shaping.

G. Other Embodiments (G-1) In the first to fifth embodiments, when a parallel movement path is included in path data, the data generation unit 411 determines whether to retract the nozzle 71 in a lamination direction and a retraction amount according to a shaping condition, and changes the path data. Then, the control unit 310 controls each unit of the three-dimensional shaping device 300 according to shaping data including the changed path data, thereby shaping a three-dimensional shaped object. Meanwhile, the control unit 310 may determine whether to retract the nozzle 71 in the lamination direction and the retraction amount during the shaping of the three-dimensional shaped object.

Figure 19:
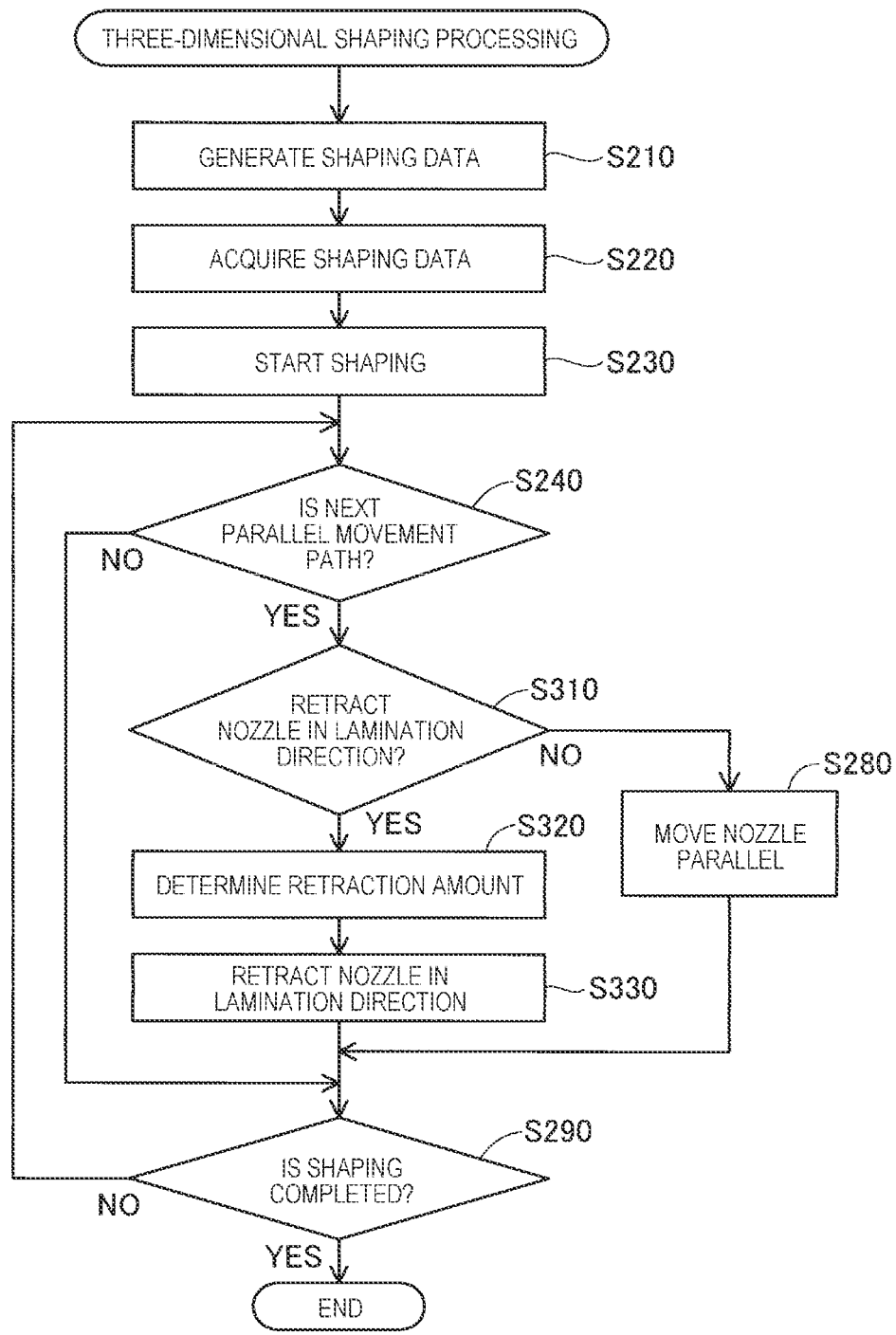
FIG. 19 is a process chart of the shaping processing when a control unit determines whether to retract a nozzle in the lamination direction and a retraction amount at a time of shaping a three-dimensional shaped object.

FIG. 19 is a process chart of shaping processing executed by the three-dimensional shaping system 100 when the control unit 310 determines whether to retract the nozzle 71 in the lamination direction and determines the retraction amount during the shaping of the three-dimensional shaped object. In FIG. 19, steps in which the same processing as that in FIG. 17 is executed are denoted by the same reference signs as those in FIG. 17, and description thereof is omitted.

If it is determined in step S240 in FIG. 19 that a movement path of the nozzle 71 to be executed next is the parallel movement path, in step S310, the control unit 310 determines whether to retract the nozzle 71 in the lamination direction according to the shaping condition of the three-dimensional shaped object when moving the nozzle 71 from the discharge stop position P1 to the discharge restart position P2.

If it is determined in step S310 that the nozzle 71 is retracted in the lamination direction, in step S320, the control unit 310 determines the retraction amount according to the shaping condition. Next, in step S330, the control unit 310 retracts the nozzle 71 in the lamination direction according to the retraction amount, and moves the nozzle 71 from the discharge stop position P1 to the discharge restart position P2.

If it is determined in step S310 that the nozzle 71 is not retracted in the lamination direction, the control unit 310 moves the nozzle 71 along the layer ML from the discharge stop position P1 to the discharge restart position P2 according to the path data as in step S280 in FIG. 17.

After step S330, after step S280, or if it is determined in step S240 that the movement path of the nozzle 71 to be executed next is not the parallel movement path, the control unit 310 determines whether the shaping of the three-dimensional shaped object is completed as in step S290 in FIG. 17.

When it is determined in step S310 in FIG. 19 that the nozzle 71 is retracted in the lamination direction according to the shaping condition of the three-dimensional shaped object, the retraction amount may not be determined according to the shaping condition. In this case, for example, the retraction amount may be set in advance by a user.

When the retraction amount is determined according to the shaping condition of the three-dimensional shaped object in step S320 in FIG. 19, whether to retract the nozzle 71 in the lamination direction may not be determined according to the shaping condition. In this case, for example, when the parallel movement path is included in the path data, the control unit 310 may determine to retract the nozzle 71 in the lamination direction.

(G-2) In the first to fifth embodiments, when it is determined in step S40 in FIG. 6 that the nozzle 71 is retracted in the lamination direction according to the shaping condition of the three-dimensional shaped object, the retraction amount may not be determined according to the shaping condition. In this case, for example, the retraction amount may be set in advance by the user. That is, at least one of whether to retract the nozzle 71 or the retraction amount may be determined according to the shaping condition of the three-dimensional shaped object.

(G-3) In the first to fifth embodiments, when the retraction amount is determined according to the shaping condition of the three-dimensional shaped object in step S50 in FIG. 6, whether to retract the nozzle 71 in the lamination direction may not be determined according to the shaping condition. In this case, for example, when the parallel movement path is included in the path data, the data generation unit 411 may determine to retract the nozzle 71 in the lamination direction. That is, at least one of whether to retract the nozzle 71 or the retraction amount may be determined according to the shaping condition of the three-dimensional shaped object.

(G-4) In the sixth embodiment, the retraction amount may not be a predetermined value and may be determined according to the shaping condition of the three-dimensional shaped object, that is, a condition relating to the temperature of the layer ML measured in the temperature measurement step. For example, when the temperature of the layer ML measured in the temperature measurement step is higher than the predetermined range, the control unit 310 may determine the retraction amount such that the retraction amount increases as the temperature increases. In addition, for example, when the temperature of the layer ML measured in the temperature measurement step is less than the predetermined range, the control unit 310 may determine the retraction amount such that the retraction amount increases as the temperature decreases.

(G-5) In the embodiments described above, the information processing apparatus 400 includes the data generation unit 411. On the other hand, the control unit 310 of the three-dimensional shaping device 300 may include the data generation unit 411.

H. Other Aspects

The present disclosure is not limited to the embodiments described above, and can be implemented in various forms without departing from the spirit of the present disclosure. For example, the present disclosure can be implemented in the following aspects. To solve a part of or all of the technical problems of the present disclosure, or to achieve a part of or all of the effects of the present disclosure, technical features according to the embodiments described above corresponding to technical features in the following aspects can be replaced or combined as appropriate. In addition, unless the technical features are described as being essential in the present description, the technical features can be appropriately deleted.

(1) According to an aspect of the present disclosure, a method for manufacturing a three-dimensional shaped object is provided. The method for manufacturing a three-dimensional shaped object is a method for manufacturing a three-dimensional shaped object in which a three-dimensional shaped object is shaped by discharging a shaping material from a nozzle and laminating layers in a lamination direction, and includes: a first step of stopping the discharge of the shaping material from the nozzle; and a second step of moving the nozzle from a discharge stop position at which the discharge of the shaping material is stopped to a discharge restart position that is located in the same layer as the discharge stop position and at which the discharge of the shaping material is restarted. The second step includes: a third step of retracting the nozzle from the discharge stop position in the lamination direction according to a retraction amount that is a movement distance of the nozzle in the lamination direction; and a fourth step of moving the nozzle to a position above the discharge restart position along the layer after the third step. At least one of whether to retract the nozzle or the retraction amount is determined according to a shaping condition of the three-dimensional shaped object.

According to such an aspect, when the nozzle is moved from the discharge stop position to the discharge restart position, the nozzle is retracted in the lamination direction according to the retraction amount, and then the nozzle is moved along the layer. Therefore, the nozzle can be prevented from coming into contact with a part of the three-dimensional shaped object which has been already shaped. When whether to retract the nozzle is determined according to the shaping condition of the three-dimensional shaped object, the nozzle does not need to be retracted when the three-dimensional shaped object and the nozzle do not come into contact with each other without retracting the nozzle, and thus unnecessary movement of the nozzle can be reduced. When the retraction amount is determined according to the shaping condition of the three-dimensional shaped object, the nozzle can be retracted by a distance necessary for preventing the three-dimensional shaped object and the nozzle from coming into contact with each other, and thus the unnecessary movement of the nozzle can be reduced.

(2) In the above-described aspect, the shaping condition may include a condition relating to a distance between the discharge stop position and the discharge restart position, and in the third step, the nozzle may be retracted in the lamination direction when the distance between the discharge stop position and the discharge restart position is equal to or greater than a predetermined value. According to such an aspect, when the distance between the discharge stop position and the discharge restart position is small, and there is no part of the three-dimensional shaped object which has been already shaped between the discharge stop position and the discharge restart position, the nozzle does not need to be retracted, and thus the unnecessary movement of the nozzle can be reduced.

(3) In the above-described aspect, the shaping condition may include a condition relating to a height of the discharge stop position in the lamination direction or a condition relating to the number of the layers laminated below the discharge stop position, and in the third step, the nozzle may be retracted in the lamination direction when the height of the discharge stop position in the lamination direction is equal to or greater than a predetermined value or when the number of the layers laminated below the discharge stop position is equal to or greater than a predetermined value. According to such an aspect, even when the three-dimensional shaped object swings, it is possible to reduce a possibility that the nozzle comes into contact with a part of the three-dimensional shaped object which has been already shaped.

(4) In the above-described aspect, the shaping condition may include a condition relating to a height of the discharge stop position in the lamination direction or a condition relating to the number of the layers laminated below the discharge stop position, and when there is a first discharge stop position that is the discharge stop position in an n-th layer among the layers and a second discharge stop position that is the discharge stop position in a layer higher than the n-th layer in the lamination direction, n being a natural number, the retraction amount at the second discharge stop position may be larger than the retraction amount at the first discharge stop position. According to such an aspect, even when the three-dimensional shaped object swings, it is possible to reduce a possibility that the nozzle comes into contact with a part of the three-dimensional shaped object which has been already shaped at the second discharge stop position.

(5) In the above-described aspect, the shaping condition may include a condition relating to a shape of the three-dimensional shaped object in a movement range of the nozzle from the discharge stop position to the discharge restart position, and the retraction amount when a part of the three-dimensional shaped object having a shape protruding in the lamination direction is located in the movement range may be larger than the retraction amount when a part of the three-dimensional shaped object having a shape protruding in the lamination direction is not located in the movement range. According to such an aspect, even when the three-dimensional shaped object swings while the nozzle is moved from the discharge stop position to the discharge restart position, it is possible to reduce a possibility that the nozzle comes into contact with a part of the three-dimensional shaped object having a shape protruding in the lamination direction.

(6) In the above-described aspect, the shaping condition may include a condition relating to a structural position of the three-dimensional shaped object in a part where shaping is performed, and the retraction amount for shaping an outline of the three-dimensional shaped object may be larger than the retraction amount for shaping an inner region of the three-dimensional shaped object. According to such an aspect, it is possible to reduce a possibility that the nozzle comes into contact with the outline of the three-dimensional shaped object. Therefore, it is possible to prevent deterioration in a shaping accuracy of the outline of the three-dimensional shaped object on which the shaping is completed.

(7) In the above-described aspect, the method for manufacturing a three-dimensional shaped object may further include a temperature measurement step of measuring a temperature of the layer located one layer below the layer having the discharge stop position and the discharge restart position. The shaping condition may include a condition relating to the temperature of the layer measured in the temperature measurement step, and in the third step, the nozzle may be retracted in the lamination direction when the temperature of the layer measured in the temperature measurement step is out of a predetermined range. According to such an aspect, even when the three-dimensional shaped object is deformed by being cooled or even when the three-dimensional shaped object is likely to swing by being heated, it is possible to reduce a possibility that the three-dimensional shaped object and the nozzle come into contact with each other.

(8) According to a second aspect of the present disclosure, a three-dimensional shaping system is provided. The three-dimensional shaping system includes: a plasticization unit configured to plasticize a material to generate a shaping material; a discharge unit including a nozzle configured to discharge the shaping material; a table on which the shaping material discharged from the nozzle is laminated; a position change unit configured to change a relative position between the nozzle and the table; a data generation unit configured to generate path data representing a movement path of the nozzle with respect to the table; and a control unit configured to control the plasticization unit, the discharge unit, and the position change unit, move the nozzle with respect to the table according to the path data, and shape a three-dimensional shaped object by laminating layers of the shaping material on the table in a lamination direction. When the nozzle is moved from a discharge stop position at which the discharge of the shaping material from the nozzle is stopped to a discharge restart position that is located in the same layer as the discharge stop position and at which the discharge of the shaping material is restarted, the data generation unit or the control unit determines, according to a shaping condition of the three-dimensional shaped object, at least one of whether to retract the nozzle from the discharge stop position in the lamination direction or a retraction amount that is a movement distance of the nozzle in the lamination direction when the nozzle is retracted in the lamination direction, and the control unit moves the nozzle to a position above the discharge restart position along the layer after retracting the nozzle in the lamination direction when the nozzle is retracted in the lamination direction.

(9) According to a third aspect of the present disclosure, an information processing apparatus is provided. The information processing apparatus is an information processing apparatus for generating data for shaping a three-dimensional shaped object by discharging a shaping material from a nozzle to laminate layers in a lamination direction, and includes a data generation unit configured to generate path data representing a path along which the nozzle is moved in the shaping of the three-dimensional shaped object. When a parallel movement path in which the nozzle is moved along the layer from a discharge stop position at which the discharge of the shaping material from the nozzle is stopped to a discharge restart position that is located in the same layer as the discharge stop position and at which the discharge of the shaping material from the nozzle is restarted is included in the path data, the data generation unit determines, according to a shaping condition of the three-dimensional shaped object, at least one of whether to retract the nozzle from the discharge stop position in the lamination direction or a retraction amount that is a movement distance of the nozzle in the lamination direction when the nozzle is retracted in the lamination direction, and changes the path data such that the nozzle is retracted from the discharge stop position in the lamination direction according to the retraction amount in the parallel movement path.

What is claimed is:

1. A method for manufacturing a three-dimensional shaped object in which a three-dimensional shaped object is shaped by discharging a shaping material from a nozzle and laminating layers in a lamination direction, the method comprising:
   a first step of stopping the discharge of the shaping material from the nozzle; and
   a second step of moving the nozzle from a discharge stop position at which the discharge of the shaping material is stopped to a discharge restart position that is located in the same layer as the discharge stop position and at which the discharge of the shaping material is restarted, wherein
   the second step includes:
      a third step of retracting the nozzle from the discharge stop position in the lamination direction according to a retraction amount that is a movement distance of the nozzle in the lamination direction; and
      a fourth step of moving the nozzle to a position above the discharge restart position along the layer after the third step, and
   at least one of whether to retract the nozzle or the retraction amount is determined according to a shaping condition of the three-dimensional shaped object; and
   wherein the shaping condition includes a condition relating to a height of the discharge stop position in the lamination direction or a condition relating to the number of the layers laminated below the discharge stop position, and
   when there is a first discharge stop position that is the discharge stop position in an n-th layer among the layers and a second discharge stop position that is the discharge stop position in a layer higher than the n-th layer in the lamination direction, n being a natural number, the refraction amount at the second discharge stop position is larger than the retraction amount at the first discharge stop position.

2. The method for manufacturing a three-dimensional shaped object according to claim 1, wherein
   the shaping condition includes a condition relating to a distance between the discharge stop position and the discharge restart position, and
   in the third step, the nozzle is retracted in the lamination direction when the distance between the discharge stop position and the discharge restart position is equal to or greater than a predetermined value.

3. The method for manufacturing a three-dimensional shaped object according to claim 1, wherein
   in the third step, the nozzle is retracted in the lamination direction when the height of the discharge stop position in the lamination direction is equal to or greater than a predetermined value or when the number of the layers laminated below the discharge stop position is equal to or greater than a predetermined value.

4. The method for manufacturing a three-dimensional shaped object according to claim 1, wherein
   the shaping condition includes a condition relating to a shape of the three-dimensional shaped object in a movement range of the nozzle from the discharge stop position to the discharge restart position, and
   the retraction amount when a part of the three-dimensional shaped object having a shape protruding in the lamination direction is located in the movement range is larger than the retraction amount when a part of the three-dimensional shaped object having a shape protruding in the lamination direction is not located in the movement range.

5. The method for manufacturing a three-dimensional shaped object according to claim 1, wherein
   the shaping condition includes a condition relating to a structural position of the three-dimensional shaped object in a part where shaping is performed, and
   the retraction amount for shaping an outline of the three-dimensional shaped object is larger than the retraction amount for shaping an inner region of the three-dimensional shaped object.

6. The method for manufacturing a three-dimensional shaped object according to claim 1, further comprising:
   a temperature measurement step of measuring a temperature of the layer located one layer below the layer having the discharge stop position and the discharge restart position, wherein
   the shaping condition includes a condition relating to the temperature of the layer measured in the temperature measurement step, and
   in the third step, the nozzle is retracted in the lamination direction when the temperature of the layer measured in the temperature measurement step is out of a predetermined range.

* * * * *